(No Model.)
N. LEONARD.
BARLEY FORK.
No. 546,740.  Patented Sept. 24, 1895.
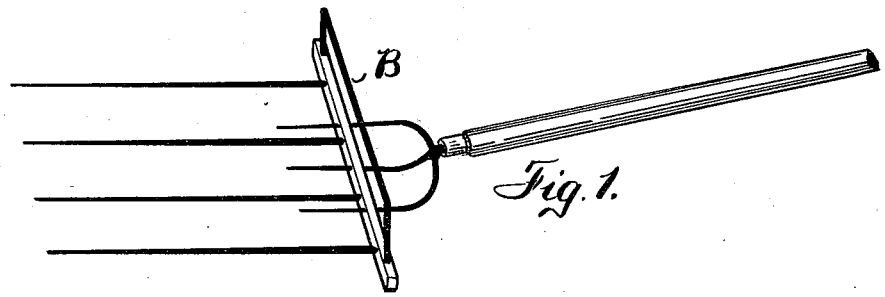
Fig. 1.
Fig. 2.
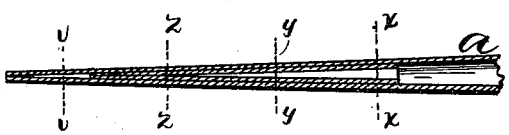
Fig. 3.
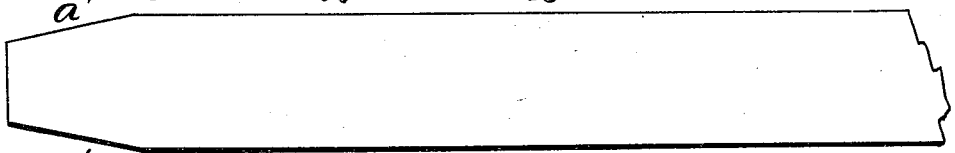
Fig. 4. Fig. 5. Fig. 6. Fig. 7.
Fig. 8.
Fig. 9.
Fig. 10.
WITNESSES:
Charles W. Marvin.
Jessie E. Murray.
INVENTOR
Newton Leonard.
BY
Smith & Armson
ATTORNEYS.

UNITED STATES PATENT OFFICE.

NEWTON LEONARD, OF WASHINGTON MILLS, NEW YORK.

BARLEY-FORK.

SPECIFICATION forming part of Letters Patent No. 546,740, dated September 24, 1895.

Application filed April 29, 1895. Serial No. 547,466. (No model.)

*To all whom it may concern:*

Be it known that I, NEWTON LEONARD, of Washington Mills, in the county of Oneida, in the State of New York, have invented new and useful Improvements in Barley or Similar Forks, of which the following, taken in connection with the accompanying drawings, is a full, clear, and exact description.

This invention relates to barley or similar forks as a new article of manufacture.

My object is to produce as a new article of manufacture a fork-body to which a common two or three tined fork can be attached, and to that end my further object is to improve the detailed construction of the fork and means for securing the tines to the body.

My invention consists in the several new and novel features and combination of parts hereinafter described, and which are specifically set forth in the claim hereunto annexed.

It is constructed as follows, reference being had to the accompanying drawings, in which—

Figure 1 is a view of the fork complete, having a three-tined fork attached thereto, the same being ready for use. Fig. 2 is a longitudinal section of one of the tines, showing how it is secured within the head. Fig. 3 is a similar view of the end of the tine, enlarged. Fig. 4 is a cross-section on line $xx$ of Fig. 3. Fig. 5 is a cross-section on line $yy$ of Fig. 3. Fig. 6 is a cross-section on line $zz$ of Fig. 3. Fig. 7 is a cross-section on line $uu$ of Fig. 3. Fig. 8 is a view of the blank from which the tine is constructed. Fig. 9 is a view of the filler, which is inserted into the end of the tine after it is mounted in the head. Fig. 10 is a view of a wire staple or nail, which is driven into the filler for the purpose of expanding it within the tine, so as to secure it to the head.

Inasmuch as this application refers to the fork proper, irrespective of the handle, I have simply described the same, it being understood that the head is provided with apertures in which a fork can be secured, as shown in Fig. 1.

A is the head, in which are secured tines $a$, constructed from a piece of blank metal, as shown in Fig. 8, its ends sheared off, as shown at $a'$, so that it may be readily rolled into a point. One end of the blank form of the tine is rolled so as to make a cylinder, as shown in Fig. 2. The opposite end is rolled several times around, as shown in cross-section in Figs. 4, 5, 6, and 7, so as to form a stiff point. When the tine has thus been formed, it is inserted into the opening $b$, in the head of which it is constructed, so as to adapt itself to the periphery of the tine. A plug or filler $c$ is then driven into the tine within the head, for the purpose of expanding the tine within the head and giving it strength.

$d$ is a wire nail or brad having corrugations, barbs, or a roughened surface and a head $d'$, and is driven into the filler after it is within the tine, so as to further expand the plug and cause it to fill the tine, which in turn expands the tine within the opening in the head.

The guard B is constructed substantially as shown and is mounted upon the head A, the ends being secured therein.

Having described my invention, what I claim, and desire to secure by Letters Patent, is—

A fork comprising a head, tines constructed from pieces of sheet metal, one of the ends of said blanks being sheared off so that they will roll into a point and the opposite ends into tubes and mounted into said head, plugs inserted into the tubes and head and a staple inserted into the plugs.

In witness whereof I have hereunto set my hand on this 22d day of April, 1895.

NEWTON LEONARD.

In presence of—
JESSIE E. MURRAY,
HOWARD P. DENISON.